United States Patent
Lin

(10) Patent No.: US 10,062,491 B1
(45) Date of Patent: Aug. 28, 2018

(54) CHOKE COIL MODULE OF HIGH POWER DENSITY DC-AC POWER INVERTER

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 15/636,383

(22) Filed: Jun. 28, 2017

(51) Int. Cl.
```
H01F 27/02    (2006.01)
H01F 27/08    (2006.01)
H02J 3/00     (2006.01)
H05K 7/20     (2006.01)
F28F 7/00     (2006.01)
H02M 7/00     (2006.01)
H01F 27/28    (2006.01)
```
(52) U.S. Cl.
CPC ........... *H01F 27/025* (2013.01); *H01F 27/08* (2013.01); *H01F 27/28* (2013.01); *H02M 7/003* (2013.01)

(58) Field of Classification Search
CPC .......... H01F 27/02; H01F 27/08; H01F 27/28; H01F 27/025; H01F 27/085; H01F 27/30; H01F 27/303; H01F 17/02; H01F 17/04; H01F 17/062; H01F 2027/406; H01F 2027/40; H01F 2027/402; H02M 7/00
USPC ........ 336/59, 90, 60, 61, 210; 361/697, 690; 363/34, 141; 165/80.3
See application file for complete search history.

(56) References Cited

U.S. PATENT DOCUMENTS

| | | | | |
|---|---|---|---|---|
| 7,710,228 B2 * | 5/2010 | Feng | ...................... | H01F 17/062 29/602.1 |
| 8,922,311 B2 * | 12/2014 | Pal | ........................ | H01F 27/22 29/602.1 |
| 9,832,909 B2 * | 11/2017 | Tanaka | ............... | H05K 7/20145 |
| 2002/0026996 A1 * | 3/2002 | Krieger | ................. | H02M 7/003 165/47 |
| 2008/0183119 A1 * | 7/2008 | Joshi | .................... | A61M 1/0066 602/42 |
| 2015/0070845 A1 * | 3/2015 | Hara | ................... | H05K 7/20254 361/699 |
| 2015/0245537 A1 * | 8/2015 | Sakuma | ................ | H01F 27/085 363/141 |
| 2015/0348694 A1 * | 12/2015 | Sakuma | ............ | H05K 7/20909 336/60 |

* cited by examiner

*Primary Examiner* — Mangtin Lian
(74) *Attorney, Agent, or Firm* — Ming Chow; Sinorica, LLC

(57) ABSTRACT

A choke coil module of a high power density DC-AC power inverter includes a bottom plate and a top plate. Two upright posts are secured between the bottom plate and the top plate. The upright posts are sleeved with choke coils, respectively. The choke coils and heat radiating holes of the bottom plate and the top plate are communicated with one another to form an air guide passage. When the power converter is actuated, the choke coils generate heat. Through a fan unit, the outside air is guided into a casing via air inlets of the casing, and the heat generated by the choke coils is expelled to the outside via the air guide passage and air outlets of the casing. The choke coil module mounted in the high power density casing is able to achieve an excellent heat radiation effect.

5 Claims, 7 Drawing Sheets

CHOKE COIL MODULE OF HIGH POWER DENSITY DC-AC POWER INVERTER

FIELD OF THE INVENTION

The present invention relates to the configuration of a power inverter, and more particularly to a choke coil module of a high power density DC-AC power inverter.

BACKGROUND OF THE INVENTION

Various power inverters have been widely applied to electronic circuits to provide a stable constant voltage or constant current. Its function is that an input power type is converted into a required load power type. In general, a power inverter is composed of a power switch component, an electrical energy storage, a filter component, and a detection and control component. Thereby, the voltage or current is adjusted (switched and rectified) by the detection and control component to control the power switch component. The electric energy storage and the filter component provide the required filtering and temporary electrical energy for converting the electric energy. However, during the power conversion, the power inverter converts part of the energy supplied from the power supply into heat energy. The heat energy is concentrated in the power transistor and the choke coil of the power inverter. A choke coil is widely applied to a network, telecommunication, computer, AC power source and peripherals. The choke coil is used to filter, suppress noise, and resist electromagnetic interference (EMI). The choke coil is composed of a number of coils winding an annular magnetic core. Because the power converter is running all day long, the heat radiation of the power converter is particularly important.

However, the choke coil is often horizontally arranged in the limited space of a casing, and the heat is concentrated at the bottom of the choke coil. The power transistors and other electronic components are generally vertically arranged on the circuit board, which shields the wind blowing of the fan and cannot provide a smooth heat radiation path. As a result, the heat is concentrated at the power transistors and the choke coil of the power inverter. The power inverter may stop running or fail or be damaged due to overheating. Accordingly, the inventor of the present invention has devoted himself based on his many years of practical experiences to solve these problems.

SUMMARY OF THE INVENTION

The primary object of the present invention is to provide a choke coil module of a high power density DC-AC power inverter. The choke coil module mounted in a high power density casing is able to achieve an excellent heat radiation effect. The heat generated by a choke coil of the power inverter won't be accumulated easily and can be expelled to the outside by the wind to radiate heat quickly.

In order to achieve the aforesaid object, a choke coil module of a high power density DC-AC power inverter is provided. The power inverter comprises a casing. The choke coil module is disposed in the casing. Two sides of the casing are formed with a plurality of air inlets and a plurality of air outlets. Respectively. One of the two sides of the casing is provided with a fan unit. The choke coil module comprises a bottom plate, at least one upright post, at least one choke coil, and a top plate. The bottom plate is transversely disposed on a bottom of the casing. The bottom plate is fixedly connected to the bottom of the casing through a plurality of support posts. A gap is formed between the bottom plate and the bottom of the casing. The bottom plate is formed with a plurality of first heat radiating holes. The upright post is longitudinally disposed on the bottom plate. The upright post has two symmetrical planes. The planes are longitudinal tangential planes of two sides of the upright post. The choke coil is fitted on the upright post. A heat radiating space is defined between an inner annular wall of the choke coil and the planes of the upright post. The heat radiating space is located above the first heat radiating holes. The top plate is disposed on top of the upright post. The top plate and the bottom plate are configured to clamp the choke coil through the upright post. The top plate is formed with a plurality of second heat radiating holes corresponding to the first heat radiating holes of the bottom plate. The first heat radiating holes, the second heat radiating holes and the heat radiating space are communicated with one another to form an air guide passage.

When the power converter of the present invention is actuated, the choke coil generates heat. Through the fan unit, the outside air is guided into the casing via the air inlets of the casing, and the heat generated by the choke coil is expelled to the outside via the gap, the air guide passage and the air outlets of the casing. The choke coil module mounted in the high power density casing is able to achieve an excellent heat radiation effect.

DETAILED DESCRIPTION OF THE PREFERRED EMBODIMENTS

Embodiments of the present invention will now be described, by way of example only, with reference to the accompanying drawings.

Figure 1:
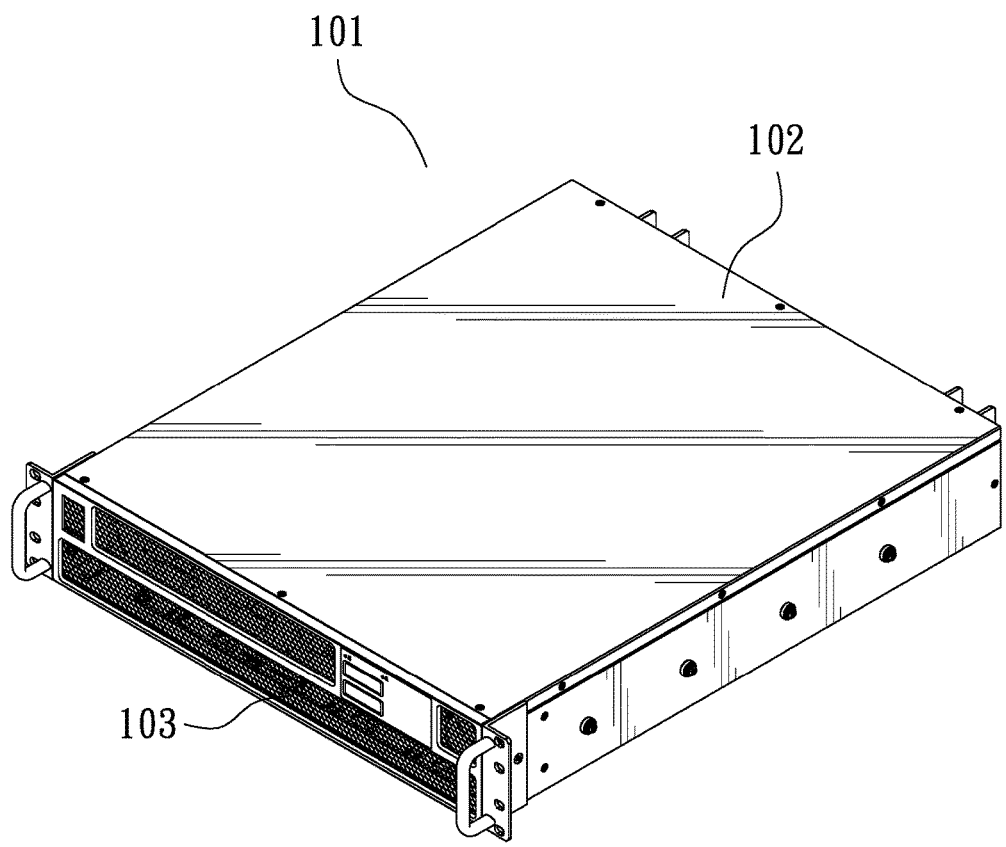
FIG. 1 is a perspective view in accordance with an embodiment of the present invention.
Figure 2:
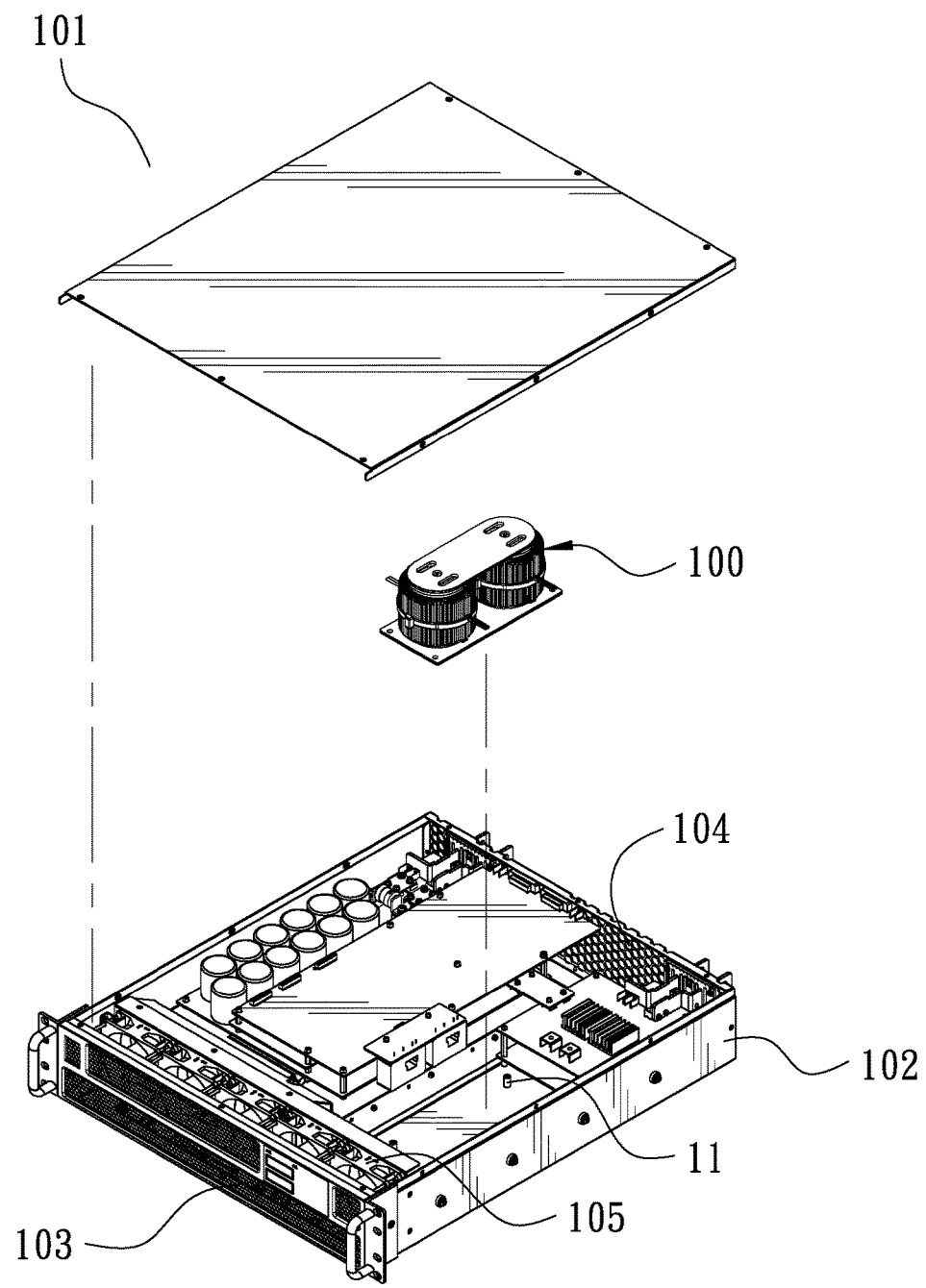
FIG. 2 is an exploded view in accordance with the embodiment of the present invention.
Figure 3:
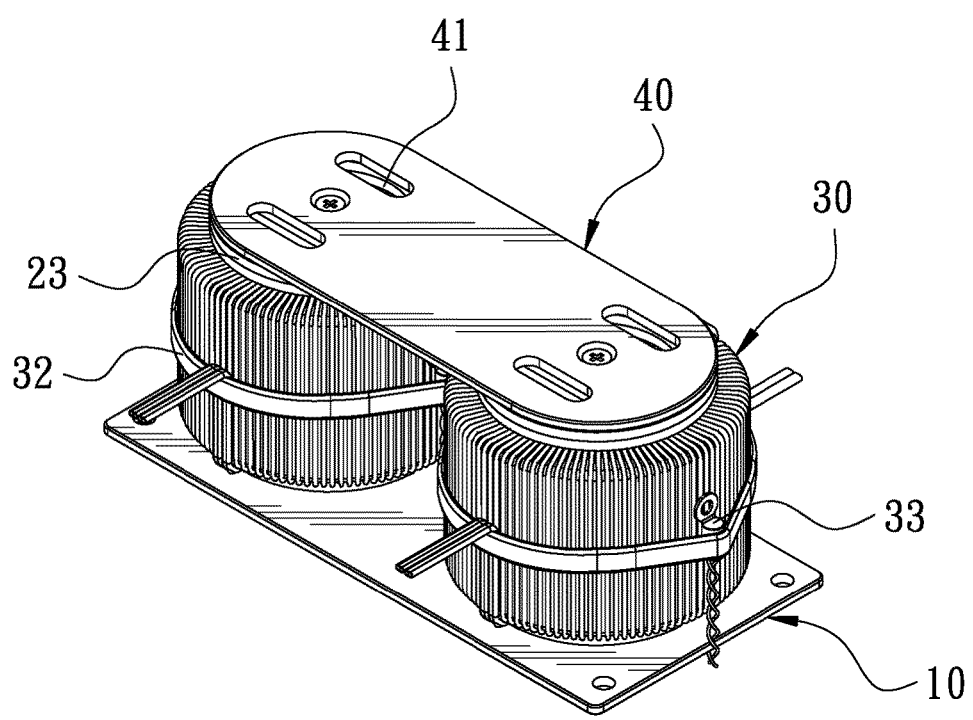
FIG. 3 is a perspective view of the choke coil module in accordance with the embodiment of the present invention.
Figure 4:
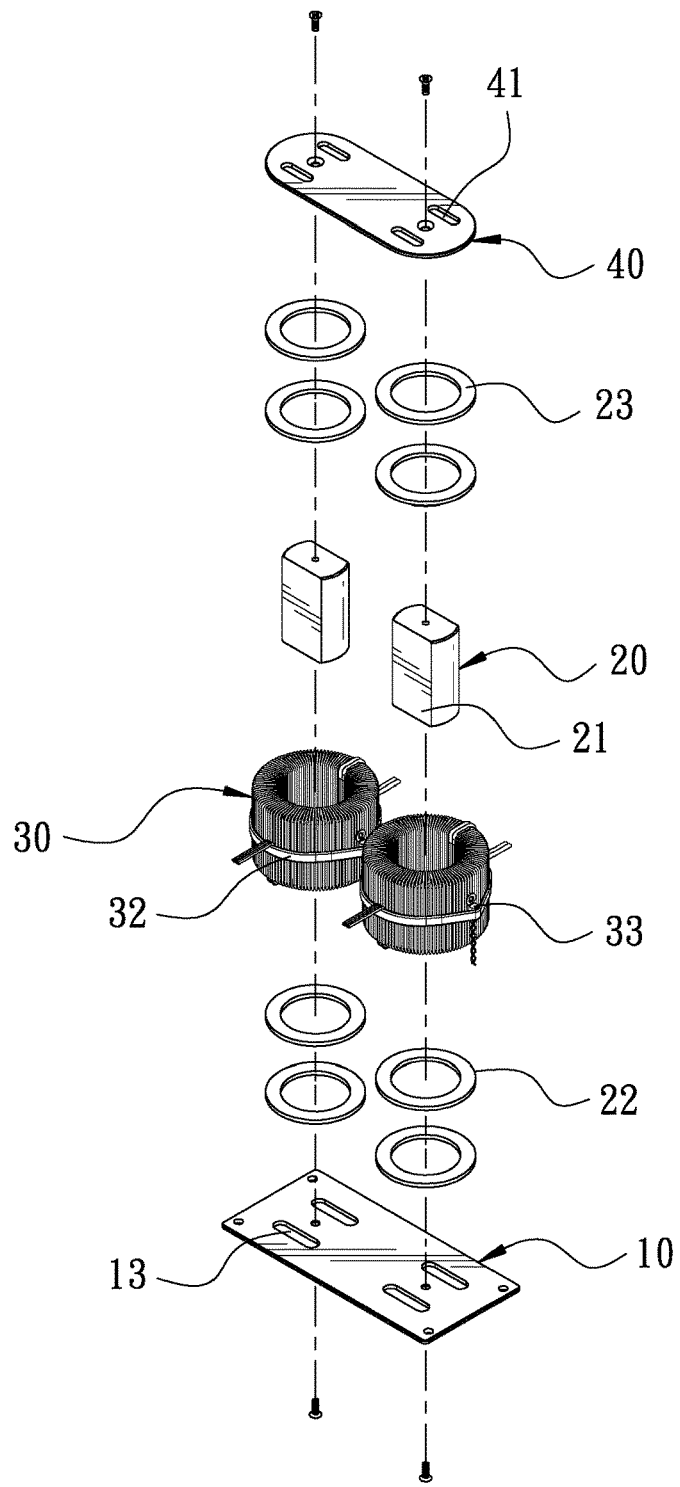
FIG. 4 is an exploded view of the choke coil module in accordance with the embodiment of the present invention.
Figure 5:
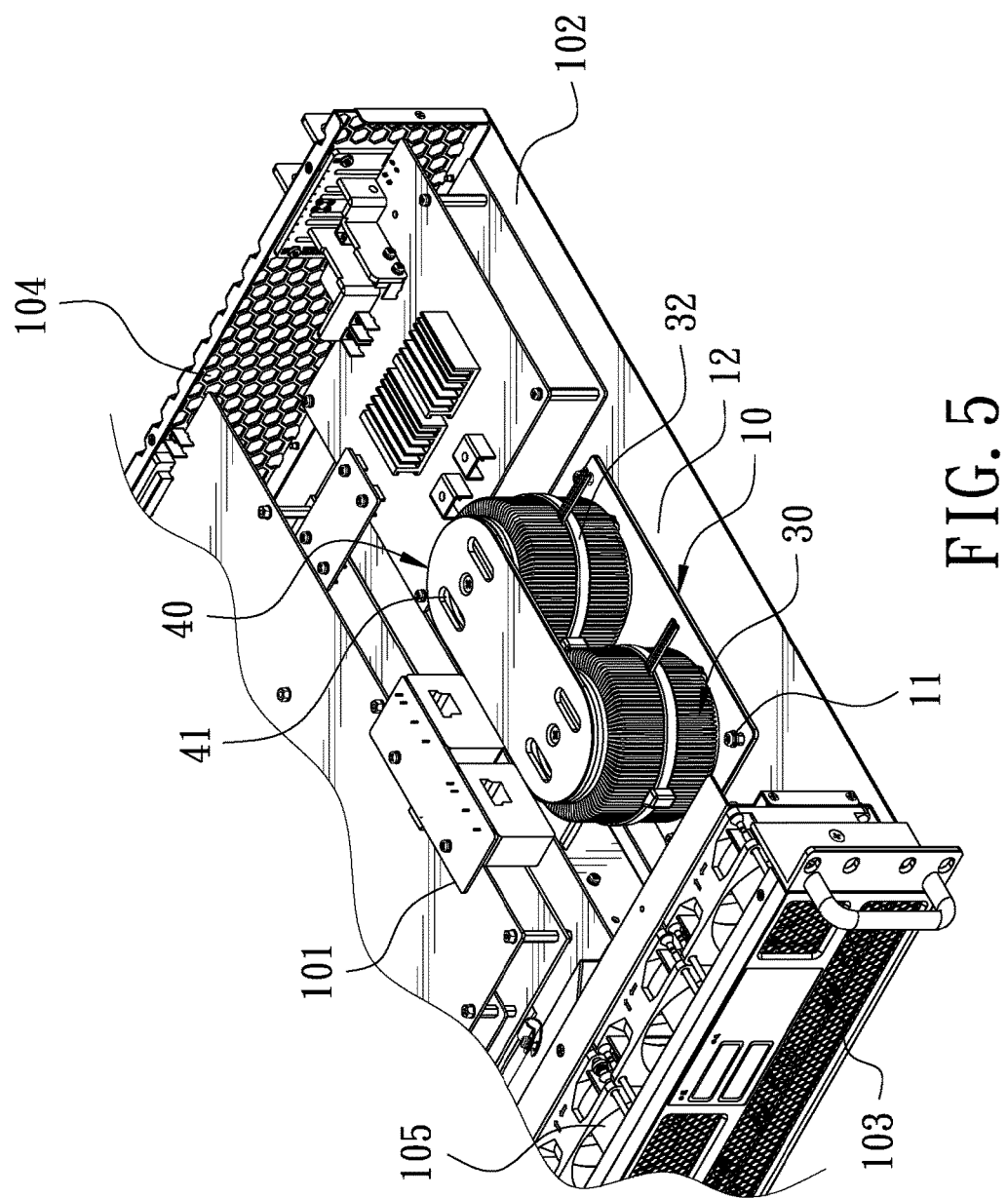
FIG. 5 is a schematic view in accordance with the embodiment of the present invention, showing the choke coil module mounted in the casing.

FIG. 1 is a perspective view in accordance with an embodiment of the present invention. FIG. 2 is an exploded view in accordance with the embodiment of the present invention. The present invention discloses a choke coil module 100 of a high power density DC-AC power inverter 101. The power inverter 101 comprises a casing 102. The choke coil module 100 is disposed in the casing 102. Two sides of the casing 102 are formed with a plurality of air inlets 103 and a plurality of air outlets 104, respectively. One of the two sides of the casing 102 is provided with a fan unit 105 for guiding the outside air into the casing 102 via the air inlets 103, and then the air is expelled via the air outlets 104. Referring to FIG. 3, FIG. 4 and FIG. 5, the choke coil module 100 includes a bottom plate 10, at least one upright post 20, at least one choke coil 30, and a top plate 40.

Figure 6:
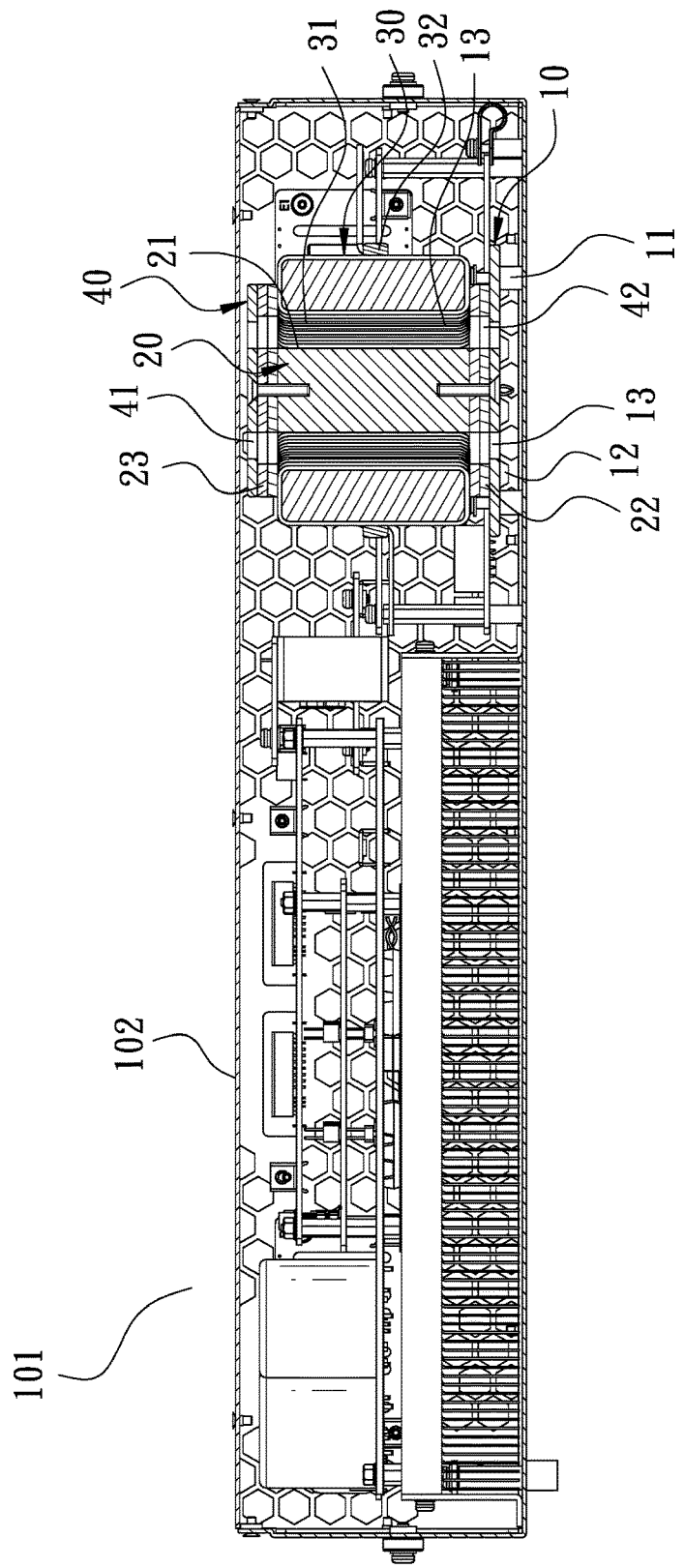
FIG. 6 is a sectional view in accordance with the embodiment of the present invention, showing the air guide passage of the choke coil module.

The bottom plate 10 is transversely disposed on the bottom of the casing 102. The bottom plate 10 is fixedly connected to the bottom of the casing 102 through a plurality of support posts 11, so that a gap 12 (as shown in FIG. 6) is formed between the bottom plate 10 and the bottom of the casing 102. The bottom plate 10 is formed with a plurality of first heat radiating holes 13.

In this embodiment, the choke coil module 100 includes two upright posts 20 longitudinally screwed on the bottom plate 10. Each upright post 10 has two symmetrical planes 21 which are longitudinal tangential planes of two sides of the upright post 20.

In this embodiment, the choke coil module 100 includes two choke coils 30 fitted on the upright posts 20 respectively. A heat radiating space 31 (as shown in FIG. 6) is defined between an inner annular wall of each choke coil 30 and the planes 21. The heat radiating space 31 is located above the first heat radiating holes 13. The choke coil 30 is circumferentially provided with a binding belt 32. A temperature sensor 33 is sandwiched between the binding belt 32 and the choke coil 30. Two first insulating spacers 22 are provided below each upright post 20, so that the first insulating spacers 22 are sandwiched between the bottom plate 10 and the corresponding choke coil 30. The first insulating spacers 22 are made of silicone having elasticity.

The top plate 40 is disposed on top of the upright posts 20 so that the top plate 40 and the bottom plate 10 are configured to clamp the choke coils 30 through the upright posts 20. The top plate 40 is formed with a plurality of second heat radiating holes 41 corresponding to the first heat radiating holes 13 of the bottom plate 10. The first heat radiating holes 13, the second heat radiating holes 41, and the heat radiating space 31 are communicated with one another to form an air guide passage 42. Two second insulating spacers 23 are provided above each upright post 20. The second insulating spacers 23 are sandwiched between the top plate 40 and the corresponding choke coil 30. The second insulating spacers 23 are made of silicone having elasticity.

Figure 7:
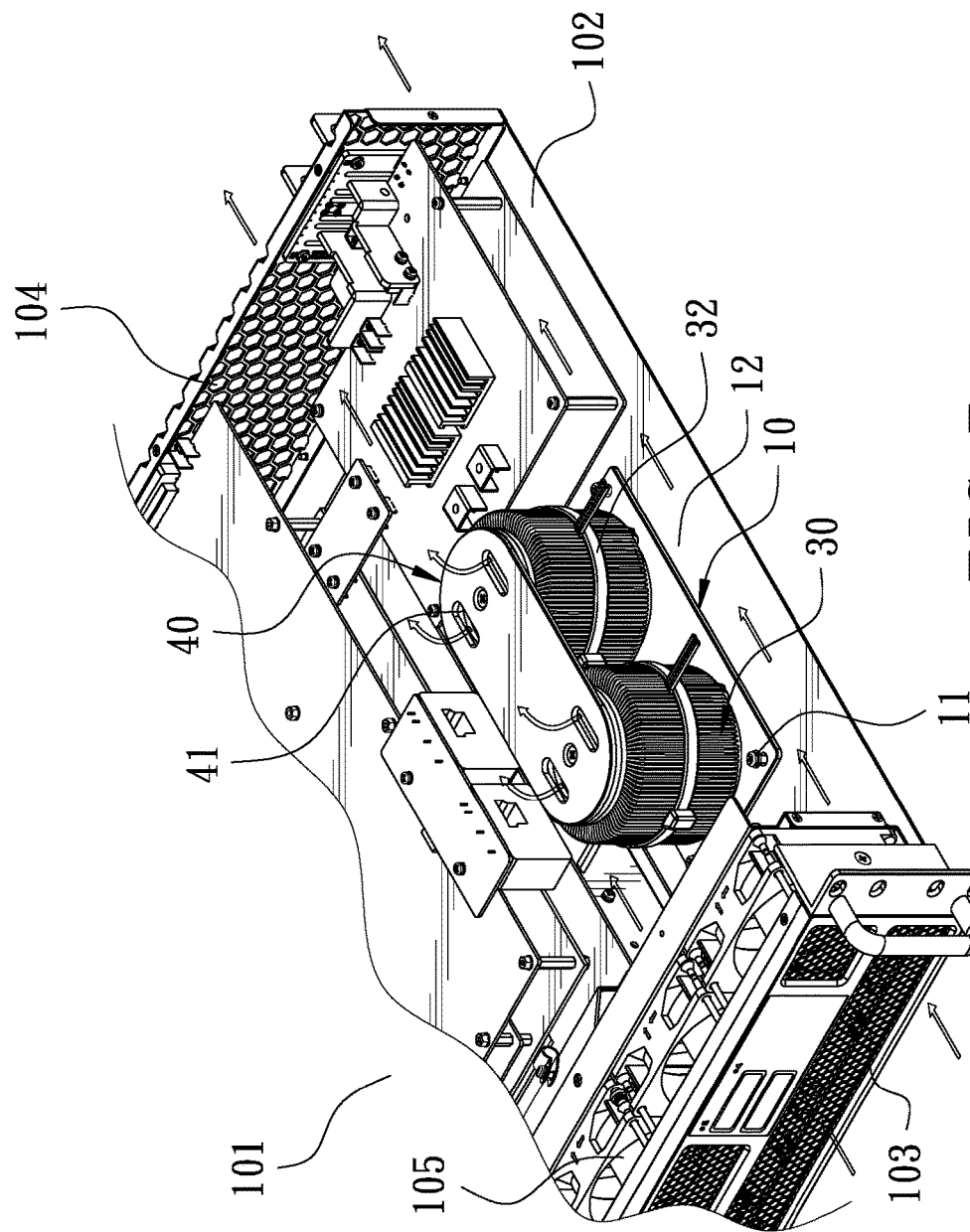
FIG. 7 is a schematic view in accordance with the embodiment of the present invention when in use, showing the heat conduction of the choke coil module.

FIG. 6 is a sectional view in accordance with the embodiment of the present invention. FIG. 7 is a schematic view in accordance with the embodiment of the present invention when in use. When the power converter 101 is actuated, the choke coils 30 generate heat and conduct the heat to the surroundings of the choke coils 30, while the fan unit 105 guides the outside air into the casing 102 via the air inlets 103 of the casing 102 to cool the choke coils 30. The bottom plate 10 is fixed to the bottom of the casing 102 through the support posts 11 to form the gap 12 between the bottom plate 10 and the bottom of the casing 102, so that a smooth heat radiating path is formed below the choke coils 30. The choke coils 30 utilize the first heat radiating holes 13, the second heat radiating holes 41, and the heat radiating space 31 to form the air guide passage 42. When the fan unit 105 guides the outside air for wind blowing, the air can be easily guided by the air guide passage 42 for heat radiation and is expelled to the outside via the air outlets 104. Thus, through the gap 12 and the air guide passage 42, the airflow path won't be affected by the choke coils 30 and the heat won't be accumulated under the choke coils 30, such that the power inverter 101 won't fail due to overheating.

It is worth mentioning that the temperature sensor 33 is capable of sensing the temperature of the choke coils 30 so that the user can know the temperature at the time of operation, thereby preventing the temperature from being too high to cause a failure of the power converter 101 because of overheating.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A choke coil module of a high power density DC-AC power inverter, the power inverter comprising a casing, the choke coil module being disposed in the casing, two sides of the casing being formed with a plurality of air inlets and a plurality of air outlets respectively, one of the two sides of the casing being provided with a fan unit for guiding outside air into the casing via the air inlets, the air being expelled via the air outlets, the choke coil module comprising:

a bottom plate, transversely disposed on a bottom of the casing, the bottom plate being fixedly connected to the bottom of the casing through a plurality of support posts, a gap being formed between the bottom plate and the bottom of the casing, the bottom plate being formed with a plurality of first heat radiating holes;

at least one upright post, longitudinally disposed on the bottom plate, the upright post having two symmetrical planes, the planes being longitudinal tangential planes of two sides of the upright post;

at least one choke coil, fitted on the upright post, a heat radiating space being defined between an inner annular wall of the choke coil and the planes of the upright post, the heat radiating space being located above the first heat radiating holes;

a top plate, disposed on top of the upright post, the top plate and the bottom plate being configured to clamp the choke coil through the upright post, the top plate being formed with a plurality of second heat radiating holes corresponding to the first heat radiating holes of the bottom plate, the first heat radiating holes, the second heat radiating holes and the heat radiating space being communicated with one another to form an air guide passage;

wherein when the power converter is actuated, the choke coil generates heat, through the fan unit, the outside air is guided into the casing via the air inlets of the casing, and the heat generated by the choke coil is expelled via the air outlets of the casing.

2. The choke coil module as claimed in claim 1, wherein the choke coil module comprises two upright posts and two choke coils.

3. The choke coil module as claimed in claim 1, wherein two first insulating spacers are provided below the upright post so that the first insulating spacers are sandwiched between the bottom plate and the choke coil, and two second insulating spacers are provided above the upright post so that the second insulating spacers are sandwiched between the top plate and the choke coil.

4. The choke coil module as claimed in claim 3, wherein the first insulating spacers and the second insulating spacers are made of silicone having elasticity.

5. The choke coil module as claimed in claim 1, wherein the choke coil is circumferentially provided with a binding belt, and a temperature sensor is sandwiched between the binding belt and the choke coil.

* * * * *